Dec. 22, 1959     O. H. PETERS     2,918,297
CART FOR CARRYING GOLF EQUIPMENT
Filed Oct. 25, 1956     5 Sheets-Sheet 1

INVENTOR.
Otto H. Peters
BY
Parker & Prechnow,
Attorneys.

Dec. 22, 1959  O. H. PETERS  2,918,297
CART FOR CARRYING GOLF EQUIPMENT
Filed Oct. 25, 1956  5 Sheets-Sheet 5
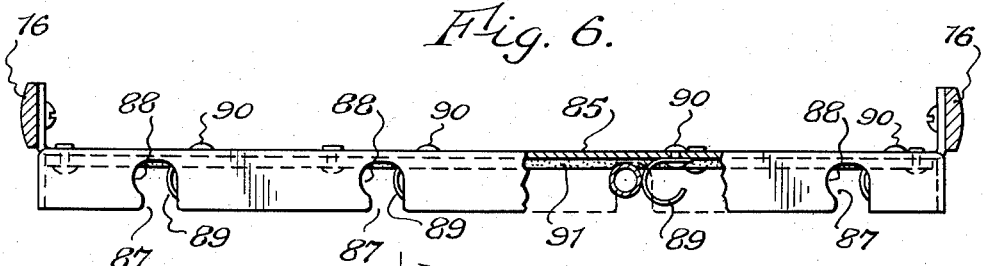
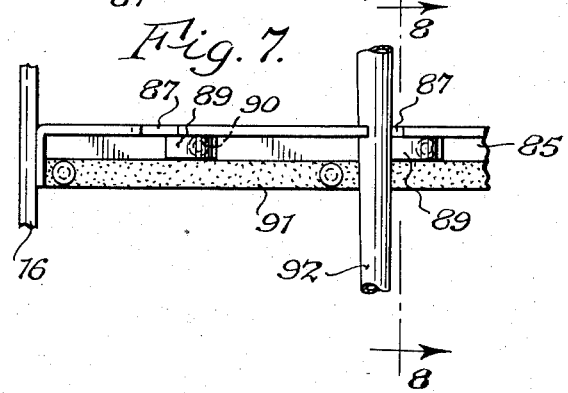
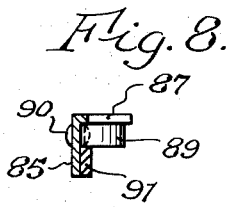
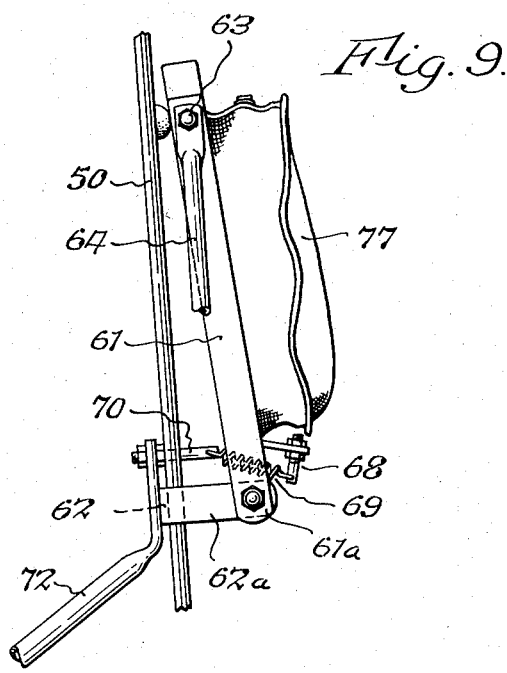
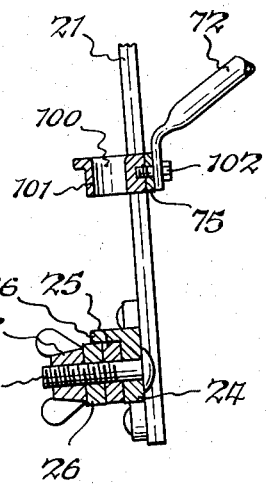

United States Patent Office 2,918,297
Patented Dec. 22, 1959

2,918,297

CART FOR CARRYING GOLF EQUIPMENT

Otto H. Peters, Williamsville, N.Y.

Application October 25, 1956, Serial No. 618,351

2 Claims. (Cl. 280—42)

This invention relates to improvements in carts of the type used by golfers for carrying golf clubs, balls and other equipment used in playing the game of golf.

The main purpose of this invention is to provide a golf cart which overcomes many of the objections of carts of this kind which have heretofore been made and in which the various articles used in playing golf are readily available and easily accessible.

Specifically one of the objects of this invention is to provide a cart of this type which is so constructed that when moved about, the weight of the equipment falls mainly upon the wheels so that the user of the cart in wheeling it from place to place may do so at the minimum of effort.

Golf carts of this kind have been made in which the wheels for the cart are movable toward and from the body of the cart so that when the wheels are close to the body, the cart will occupy the minimum of space crosswise thereof. It is an object of this invention to provide a cart of this kind of improved construction in which the wheels when adjusted remain at all times in approximately parallel relation to each other so that the cart may be wheeled even when the wheels are close to the body of the cart, and an improved mechanism is consequently provided for shifting the wheels, and a releasable holding is provided to hold them in desired positions. It is also an object to provide a cart of this kind with means of improved construction for mounting the golf clubs thereon so that they will be readily removable and replaceable and to arrange them to prevent parts of the clubs from contacting each other so as to avoid a rattling sound and to prevent the clubs from marring each other due to contact. It is also an object to provide a cart of this kind with a seat which is mounted in an improved manner so that it can readily be placed into an operative position in which position movement of the cart is prevented when the weight of a person rests on the seat. It is also the object of this invention to provide a cart of this kind which when in upright position will be amply supported to stand in upright position regardless of the grade or contour of the surface, or of wind blowing against it.

In the accompanying drawings:

Fig. 6 is a fragmentary top view thereof on line 6—6, Fig. 1.

Fig. 7 is a fragmentary side front view of a portion of the golf cart shown in Fig. 6.

Fig. 8 is the fragmentary sectional view thereof on line 8—8, Fig. 7.

Fig. 9 is a fragmentary side view thereof of an enlarged scale showing the seat arranged in its non-operative position.

Fig. 10 is a fragmentary sectional elevation thereof on line 10—10, Fig. 3.

Figure 1:
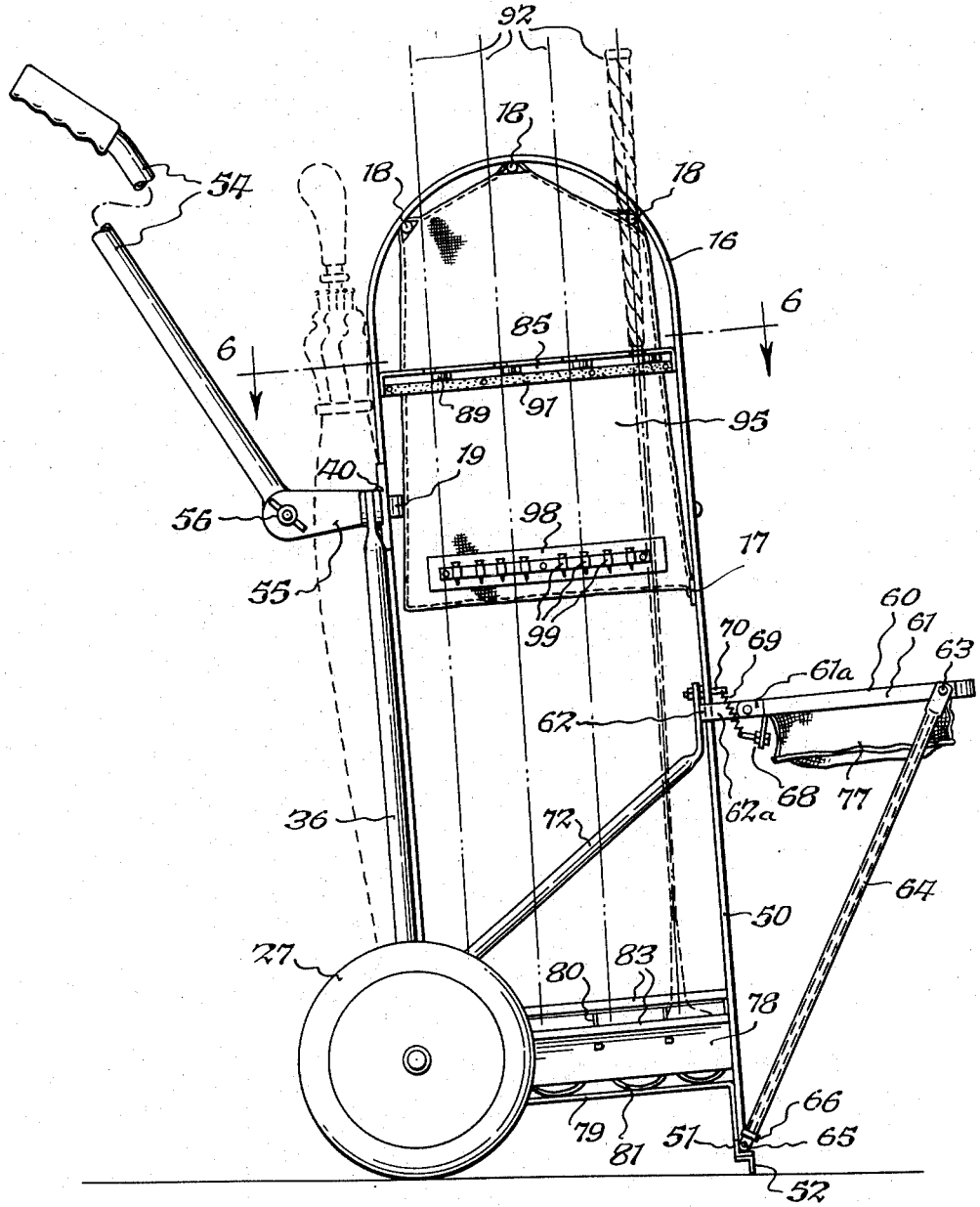
Fig. 1 is a side elevation of a golf cart embodying this invention.

One particular embodiment of my invention is illustrated by way of example in the drawings and includes a frame which comprises two inverted U-shaped structural members 15 and 16 preferably made of strips of a light weight material and connected at intervals by cross members 17, 18 and 19. The front legs on the handle end of the U-shaped members 21 and 22 are secured at their lower ends to a cross bar 24 on which two wheel supports or axle bars 25 and 26 are mounted for adjustment laterally of the cart. The wheels 27 are journaled on the outer ends of the axle bars 25 and 26.

In order to adjust the wheels 27 towards and from the frame work of the cart, the axle bars 25 and 26 are provided with slots 30 through which a bolt 31 extends, this bolt being secured to the cross bar 24 and being supplied with a wing nut 32 for clamping the two axle bars securely to each other and to the cross bar 24.

Adjacent to their outer ends the axle bars 25 and 26 are connected to brace members 35 and 36 pivoted at their upper ends on bifurcated lugs 37 and 38 formed on a bracket 40 extending crosswise of the two front legs 21 and 22 of the frame. The bracket 40 has an intermediate portion which is of arc shape and is secured to a cross member 19 secured to the front legs 21 and 22 of the U-shaped frame members. The lower ends of the brace members 35 and 36 are pivoted to short links 43. These links are also pivoted to upward extending projections 45 formed on the axle bars 25 and 26.

Figure 2:
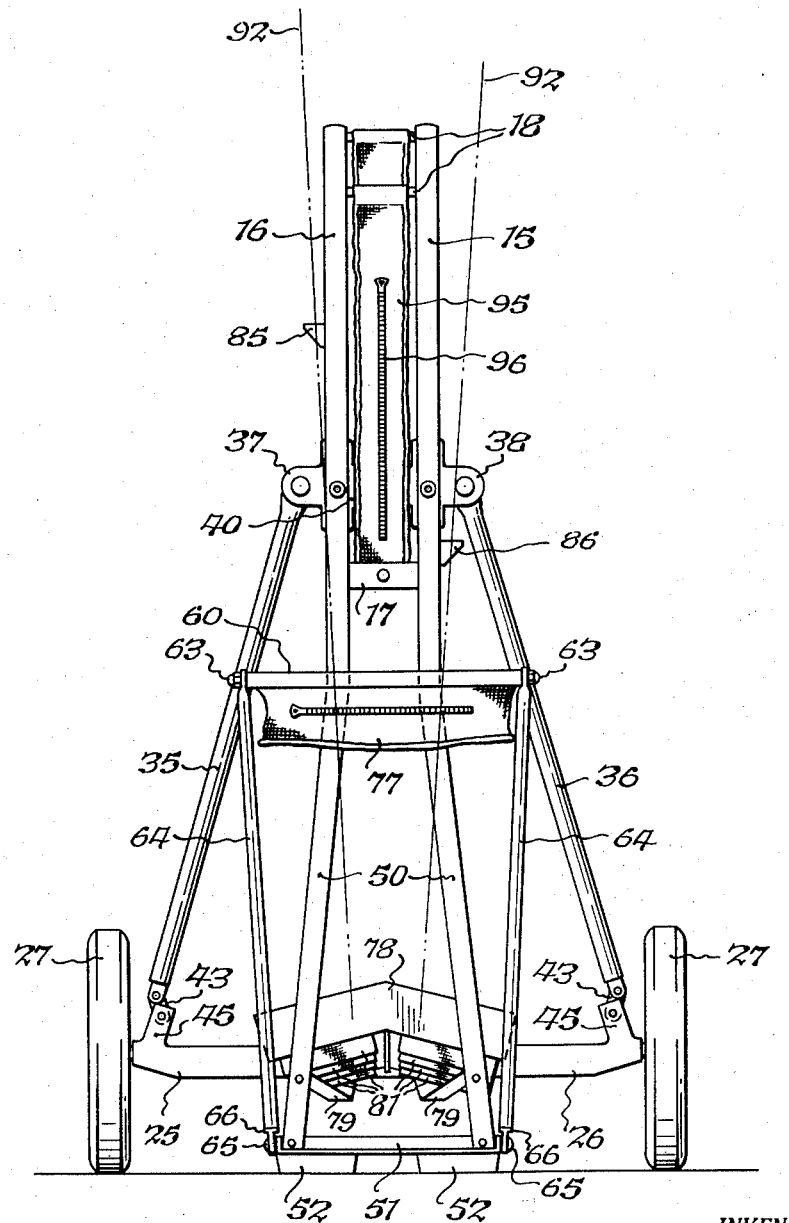
Fig. 2 is the rear elevation thereof.
Figure 3:
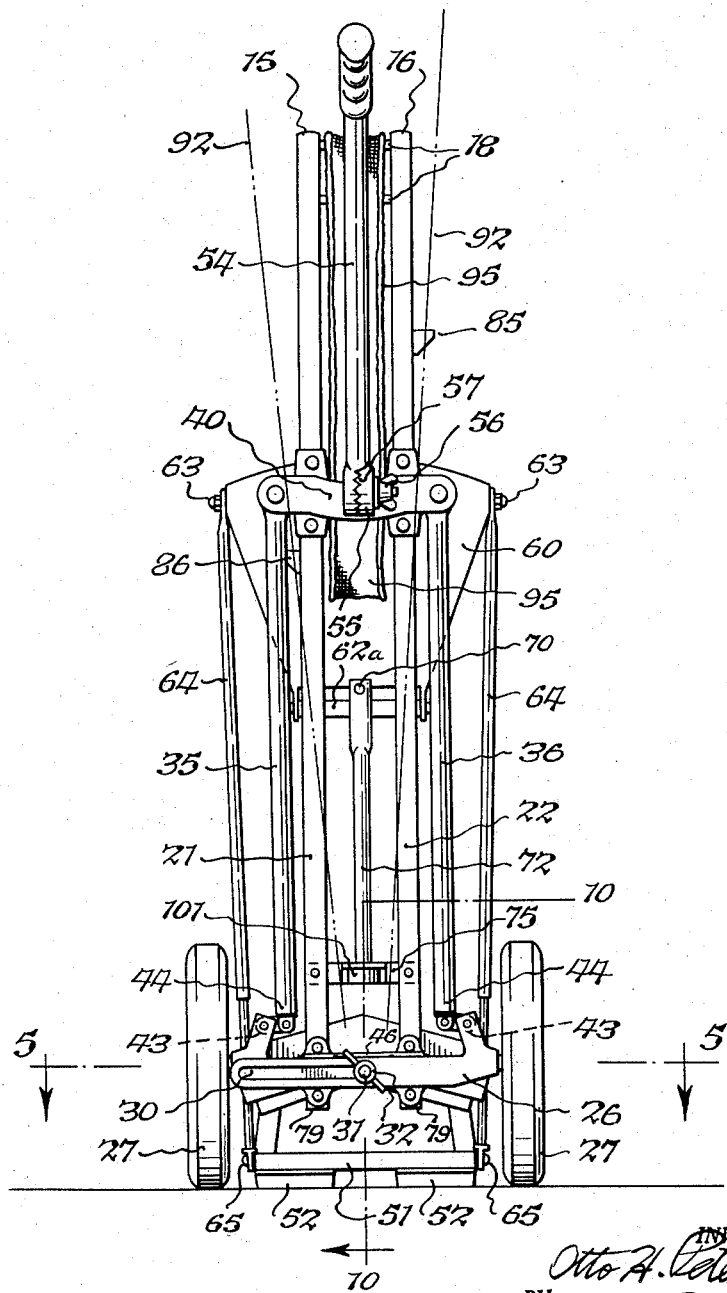
Fig. 3 is a front or handle end elevation thereof.

When the wheels 27 are in their outermost positions shown in Fig. 2, the upper ends of the links 43 extend outwardly so that the lower ends of the brace members 35 and 36 rest on the upwardly extending projections 45 of the transversely extending axle bars. When it is desired to move the wheels inwardly toward each other, the lower ends of these brace members 35 and 36 are moved inwardly toward each other, after the thumb screw 32 has been loosened, whereupon the links 43 swing inwardly toward each other into the position shown in Fig. 3 and at the same time the axle members slide relatively to each other to the extent permitted by the slots 30. The thumb screw 31 may then be tightened to hold the wheels in their inner positions and it will be noted that when the brace members are in their inner positions, as shown in Fig. 3, the lower shoulders 44 of the brace members will rest upon the links 43, thus preventing upward movement of the wheels 27. It will thus be seen that the wheels will be held in approximately parallel relation to each other when in their inner positions as well as in their outer positions.

In order to support the wheels 27 in parallel relation to each other in positions intermediate of their inner and outer positions, I have provided the cross bar 24 with a flange 46 which extends over the two axle bars 25 and 26. Consequently these axle bars will be held by the flange 46 in parallel relation to each other, which in turn holds the wheels 27 parallel to each other.

The rear legs of the frame members 15 and 16 diverge at the lower portions thereof, as shown at 50, Fig. 2, and the lower ends of these members are rigidly secured to a cross bar 51 connecting the same and provided with feet 52 which stand on the ground when the cart is in its upright position.

Figure 4:
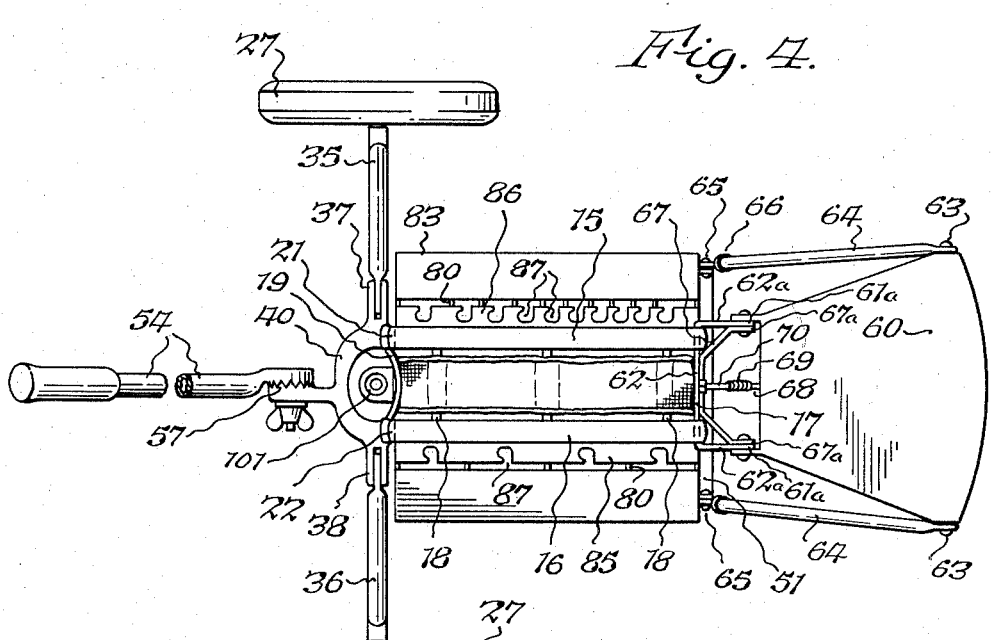
Fig. 4 is the top plan view thereof with seat in operative position.
Figure 5:
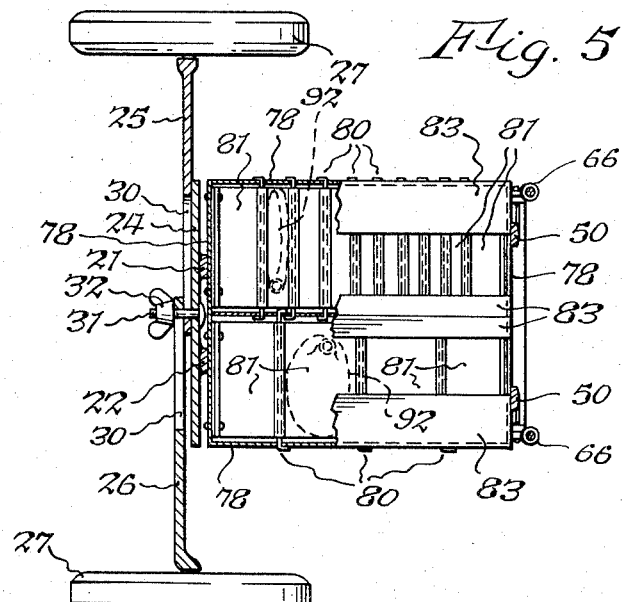
Fig. 5 is a sectional plan view thereof on line 5—5 Fig. 3.

In order to wheel the golf cart from place to place, a suitable handle 54 is provided, the lower end of which is adjustably mounted on an extension 55 of the bracket 40. This bracket and handle 54 are connected by means of a bolt which cooperates with a thumb nut 56. The handle 54 is shown in an operative position in Figs. 1 and 3, and by loosening the nut 56 the handle may be swung downwardly into position substantially parallel with the body of the cart and into various operative positions at different angles to the cart. Preferably the lower part of the handle and the projection 55 which are connected, are provided with cooperating radial teeth 57, as shown in Figs. 3 and 4, so that when the thumb nut is tightened the handle will be securely held in any position into which it is set.

The cart is also preferably provided with a seat which may be moved into an operative position when desired and which is normally held in an approximately upright or inoperative position close to the rear legs of the frame members 15 and 16 when not in use. This seat 60 is preferably made of metal or other rigid material and is formed with a flange 61 extending downwardly from the outer edges of the front and sides of the seat 60 and extending forwardly from the seat to form lugs 61a, see Figs. 1 and 4. These lugs are pivoted to two projections, 62a and 67a, which are rearwardly bent ends of transverse bars or cross members 62 and 67 connecting the two rear legs of the frame members 15 and 16.

A rod 63 extends crosswise of the outer edge of the seat 60 and reinforces the seat and also forms a pivotal connection with a pair of seat supporting legs 64, each of which comprises a pair of telescopically-arranged tubes, the upper end of one tube of each pair being pivotally connected with an end of the rod 63 of the seat and the lower end of the other tube of each pair being pivoted at 65 on one end of the cross bar 51 to which the lower ends of the rear legs of the frame members 15 and 16 are secured. Each inner tubular member is also provided near the lower end thereof with a collar or sleeve 66 against which the outer tubular member engages when the seat is in its operative position, as shown in Fig. 1. These telescoping legs 64 permit the seat to be swung upwardly about the projections 62a and 67a into its non-operating position, in which case the two tubes of the legs slide relatively to each other.

Means are preferably provided for yieldingly holding the seat in its upper or inoperative position and for this purpose the seat 60 is provided with a downwardly extending projection 68 which is connected by means of a spring 69 to a pin or stud 70 arranged in fixed relation to the rear legs of the frame members 15 and 16. It will be seen that as the seat is swung from its operative to its upright or inoperative position shown in Fig. 9, the spring 69 passes across the axis of the pivotal connection of the seat with the frame of the cart. Consequently the spring holds the seat in its upright position.

In order to help support the weight of the seat on the relatively light frame members 15 and 16, a diagonal brace 72 is preferably provided which may be in the form of a tube having its opposite ends flattened. The upper flattened end of the tube is secured to the transverse bar 62. The lower flattened end of this diagonal brace member is connected to another transverse member 75, Fig. 10, secured to the front legs of the main frame members 15 and 16. Consequently when the seat is in its operative position as shown in Fig. 1, the weight of a person sitting on the same is supported by the legs 64 and the diagonal member 72, which provide ample strength for supporting the seat, and relieving stress on the legs 50. Furthermore a large part of the weight of a person sitting on the seat is transferred to the feet 52 so that there is no danger that the cart will move or roll while a person is sitting on the seat.

77 represents a bag suitably mounted below the seat and which may be used for holding any small articles of golf equipment such as golf balls, or wearing apparel, as may be desired.

The golf clubs may be supported on the cart in any suitable manner but preferably they are arranged with their heads in pockets provided in a suitable compartmented base or club head holder 78 mounted adjacent to the lower portion of the frame between and rearwardly of the wheels. This carrier club head holder may be made in two parts which are preferably formed of a metal or other rigid material or plastic framework and canvas, rubber or other suitable flexible material 78, which protects the golf clubs from coming into contact with the metal framework. The metal or plastic framework of each unit includes sides and ends 78 and a bottom 79, the ends of which may be bent over and secured to legs of the frame members 15 and 16. Cross bars or golf head separators 80 extend across the sides of the holder and are secured to the oppositely disposed sides of the framework to form golf head compartments. The flexible sheet material 81 extends over these cross bars and along the bottom 79. The cross bars are so spaced that the space between each adjacent pair of cross bars forms a compartment or space for a club head. Consequently the heads of the clubs will be supported and laterally held in place mainly by rubber, canvas or other sheet material and will thereby prevent injury, wear or marring of the club heads due to knocking or rubbing against each other or against the club head holder frame while the cart is moved over rough ground or transported in an automobile. This has the further advantage of preventing the golf club heads from rattling against each other or the frame. Preferably flexible sheet strips or members 83 are placed across the upper edges of the compartments narrowing the opening to each compartment. The opening to each compartment is at the top of the golf head holder and is such that the toe of each club must be inserted first by holding the club, toe down, at an angle away from the cart so that, when the club is brought to an upright or vertical position, it cannot be removed from its compartment by lifting it vertically. This prevents the clubs from coming out of the compartments when the cart is laid on its side or transported in an automobile. The club head holder is so arranged that the shafts or handles of the clubs will be arranged along opposite sides of the frame of the cart. Other means of holding the club's heads, of course, may be provided if desired.

The shafts or handles of the golf clubs are secured in upright positions by means of racks 85 and 86 provided for that purpose at opposite sides of the frame, see Figs. 4, 6, 7 and 8. These racks are similar in construction so that only one will be described. They are preferably made of angle bars suitably and horizontally secured to the front and rear legs of each of the U-shaped frame members 15 and 16, and the horizontal flanges of these angle bars are preferably provided with openings 87 cut in from the outer edge and having neck portions through which the shafts may pass to enlarged spaces or recesses 88. The shafts are yieldingly held in the enlarged spaces by means of springs 89 which urge the clubs into the enlarged spaces 88. In this manner a club shaft is securely but removably held in its recess by means of the spring 89, and this spring consequently also serves to prevent the shafts of the clubs from rattling. The springs may be of any suitable shape and, as shown in Fig. 6, are in the form of open loops secured by means of rivets 90 to the rack bars. One of these racks 85 is attached higher on the frame for use with longer clubs than the rack 86 which receives the clubs with shorter shafts and smaller heads, and is consequently provided with a larger number of recesses. Thus each club is provided with its own separate compartment to receive the club head and a slot or recess to receive shaft. The lower flange of the rack bar 85 is also preferably provided with a strip 91 of padding material against which the shafts of the golf clubs rest. This material further prevents damage to the shafts of the golf clubs and prevents rattling of the same. 92 represents the shafts of the clubs which are indicated in dot and dash lines in some of the figures for the sake of clarity.

Between the two main frame members 15 and 16 and the rack bars 85 and 86 is arranged a bag 95 which is preferably suitably suspended from the cross bars 18 of the frame. This bag may be provided with a zipper 96 at the side thereof to be accessible between the frame members thereof as shown in Fig. 2, through which wearing apparel and other articles may be inserted, and this bag is preferably made of waterproof material. The two racks which support the shafts of the clubs extend across the opposite sides of the bag 95 and serve to hold the lower part of the same in place.

At the lower end of one of the sides of the bag 95 is provided a strip of material 98 provided with small loops 99 formed to receive tees.

The bracket 40 is bowed outwardly and the cross member 19 is bowed inwardly thus forming a space between these two parts through which an umbrella may be inserted, see Fig. 1, and the lower end or tip of the umbrella may be inserted into a hole 100 formed in a sleeve 101 which is part of the cross frame member 75 to which the lower end of the brace 72 is secured, Fig. 10, and this sleeve may be held in place by means of a screw 102 which also fastens the lower end of the diagonal brace 72 to the transverse frame member 75, see Fig. 10.

The golf cart described has the advantage that when it is in an inclined position for rolling it over a surface, the weight of the heads of the clubs and other parts of the cart is approximately balanced over or back of the wheels 27, which creates a tendency to roll the cart forward, much to the advantage of the user. In order to obtain the best balance, the handle 54 may be adjusted so that the weight is mainly upon the wheels.

The golf cart, when the handle 54 is swung down into a postion approximately parallel with the legs of the U-shaped frame members, and when the two wheels are moved close to the frame members, is compact and occupies a small amount of space so that it can be readily placed into the trunk space or in front of the back seat of an automobile. The cart has the advantage that all of the accessories needed to play golf are in readily accessible positions so that it is not necessary to provide a golf bag for use with the cart. When the cart is in its upright position, a sufficient part of the weight will act on the feet 52 to brace them against the ground so that when the cart is on an incline it will not tend to roll down. The manner of mounting the clubs on the cart not only makes them readily available but also separates each club from the other clubs so that no part of any club touches another club, thus avoiding any marring of the finish of the clubs, either when the cart is moved over a golf course or when transported in an auto.

The arrangement of the seat is such that it and the weight of the person sitting on it rests mainly on the feet 52, thus eliminating the possibility of having the golf cart roll away while a person is sitting on the seat.

It will be understood that various changes in the details, materials and arrangements of parts, which are herein described and illustrated in order to explain the nature of the invention, may be made by those skilled in the art, within the principle and scope of the invention, as expressed in the appended claims.

I claim:

1. A golf cart having a frame including a pair of frame members spaced apart and of inverted U-shape, having front and rear legs, connecting frame members extending transversely of said U-shaped members and secured thereto, a pair of wheels mounted on the front legs of said U-shaped members, ground-engaging feet on the lower ends of the other legs of said U-shaped members, supporting means for golf clubs secured on said frame, said wheels being mounted on axle bars, said axle bars being adjustable lengthwise of each other to vary the distance between said wheels, said axle bars having upwardly extending projections adjacent to the outer ends thereof, braces pivotally connected to said frame at their upper ends, and links connecting the lower ends of said braces to said projections, said links when swung outwardly from said projections supporting the lower ends of said braces at a greater distance from said axle bars than when swung toward each other, to compensate for the difference in distance between the pivots of the upper ends of said braces and said projections when said wheels are spaced farther from or closer to said frame.

2. A golf cart having a frame including a pair of side frame members spaced apart and of inverted U-shape forming front and rear legs, the rear legs being longer than the front legs, connecting frame members extending transversely of said U-shaped members and secured thereto, a pair of wheels mounted on the front legs of said U-shaped members, the other legs of said U-shaped members diverging laterally, ground engaging feet on the lower ends of the other legs of said U-shaped members, supporting means for golf clubs secured on the outside of said frame, and a bag on the inside of said frame for receiving other golfing equipment, said wheels being mounted on axle bars, said axle bars being adjustable horizontally and lengthwise in parallel relation to each other to vary the distance between said wheels, a flanged bar mounted on the lower parts of the front legs of said frame relatively to which said axle bars are slidable and which holds said axle bars against moving out of parallel relation to each other, said axle bars being provided with longitudinal slots, and a bolt secured in fixed relation to said frame and extending through said slots and having a nut cooperating therewith to secure said bars in fixed relation to each other.

References Cited in the file of this patent

UNITED STATES PATENTS

| | | |
|---|---|---|
| 1,126,303 | Seng | Jan. 26, 1915 |
| 1,282,753 | Carwalho | Oct. 29, 1918 |
| 1,491,144 | Kondroik | Apr. 22, 1924 |
| 1,719,360 | Deike | July 2, 1929 |
| 2,028,694 | Spinks | Jan. 21, 1936 |
| 2,411,965 | Hartung | Dec. 3, 1946 |
| 2,438,078 | Sutphen | Mar. 16, 1948 |
| 2,508,059 | Burtt | May 16, 1950 |
| 2,539,336 | Sobers | Jan. 23, 1951 |
| 2,556,814 | Love | June 12, 1951 |
| 2,597,386 | Schmid | May 20, 1952 |
| 2,673,589 | Kunkel | Mar. 30, 1954 |
| 2,726,875 | Murcott | Dec. 13, 1955 |
| 2,754,130 | Procter | July 10, 1956 |
| 2,757,012 | Leffler | July 31, 1956 |
| 2,761,691 | George | Sept. 4, 1956 |
| 2,854,686 | Hansen | Oct. 7, 1958 |

FOREIGN PATENTS

| | | |
|---|---|---|
| 202,078 | Australia | June 6, 1956 |
| 519,351 | Canada | Dec. 13, 1955 |
| 206,322 | Germany | June 10, 1908 |
| 629,213 | Great Britain | Sept. 14, 1949 |
| 449,954 | Italy | July 5, 1949 |